…

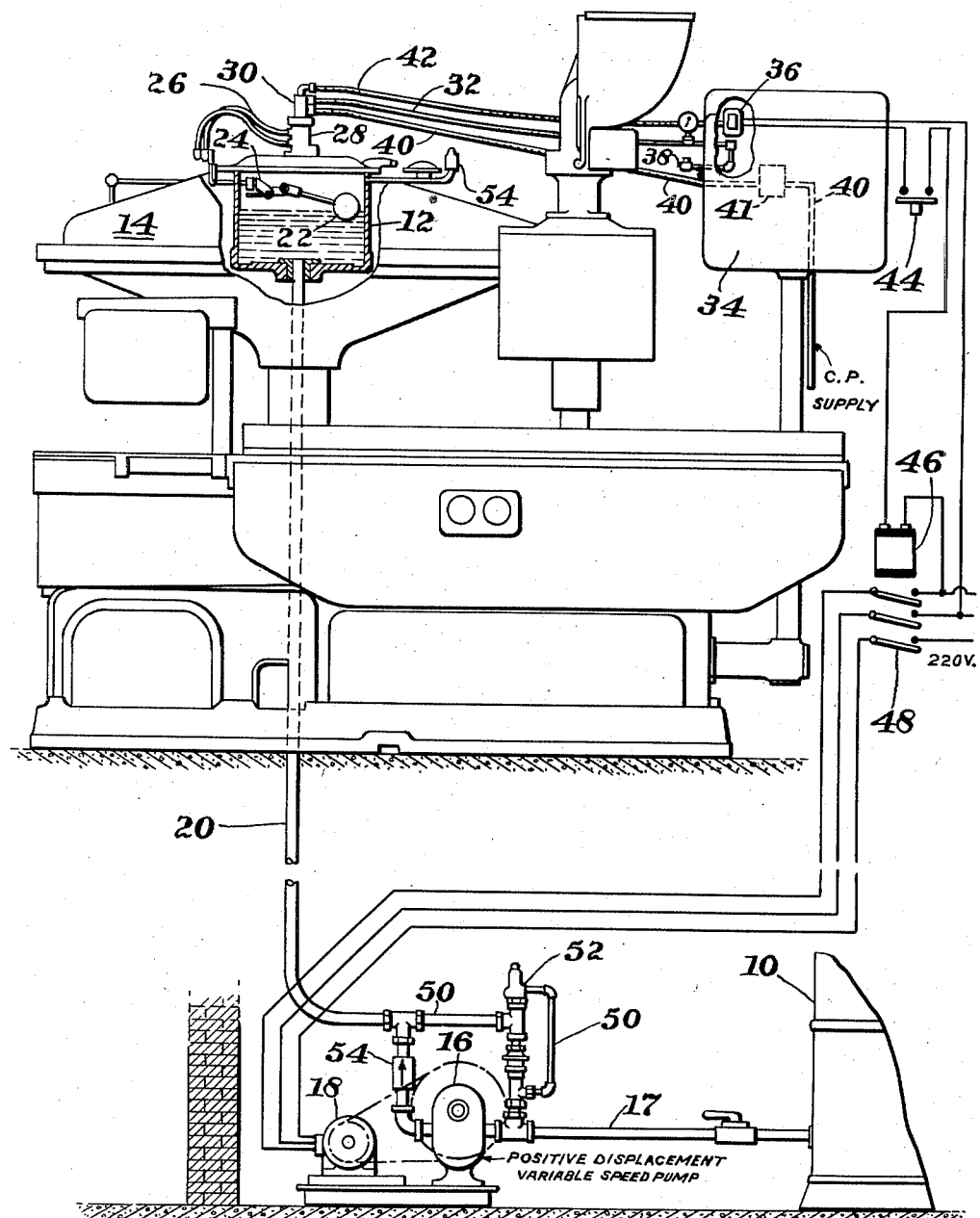

United States Patent Office 2,888,944
Patented June 2, 1959

2,888,944

FILLING SYSTEM

Rudolph H. Breeback, Baltimore, Md., assignor to Crown Cork & Seal Company, Inc., Baltimore, Md., a corporation of New York Continuation of abandoned application Serial No. 261,555, December 13, 1951. This application September 10, 1956, Serial No. 609,024

2 Claims. (Cl. 137—209)

The present invention relates to a filling system and more particularly to a system for delivering beer or other carbonated beverages to a filling machine. The application is a continuation of my application for Filling System Serial No. 261,555, filed December 13, 1951, now abandoned.

An object of this invention is the provision of a system for delivering beer to a reservoir of a filling machine whereby the supply of liquid in the reservoir will be controlled by a pressure actuated switch so connected to the reservoir that the pressure acting upon the switch is controlled by the liquid level within the reservoir.

Another object of this invention is the provision of a system for delivering beer to a reservoir of a filling machine whereby the pressure and level of the liquid in the reservoir can be controlled within a range independent of the level and pressure of the liquid in government tank.

Other objects and advantages of the system will be apparent from the following specification and accompanying drawing.

Referring specifically to the drawing, the beer to be filled is stored in a storage tank 10 commonly known as a government tank. The storage tank 10 may be located in any section of the brewery, and suitable pipes or conduits are connected thereto from the filling machine. The beer is pumped from the storage tank 10 to the reservoir 12 of the filling machine 14 by means of a positive displacement and variable speed pump 16 located intermediate of the tank 10 and filling machine 14. The pump 16 is connected to tank 10 by a beer line 17 and is driven by an electric motor 18, the control of which will be described in more detail later on in the specification. Any desired volume of beer may be delivered to the reservoir 12 by adjusting the speed of the pump 16 and this may be done to suit existing operating conditions of a particular brewery.

The filling machine 14 is of the conventional rotary type having a rotating reservoir 12 mounted above a filling table. A plurality of filling heads, not shown, are supported by the reservoir 12 for delivering beer to containers supported on the rotating filling table. A pipe or conduit 20 is connected to the outlet side of the pump 16 and enters the filling machine from beneath and up through the central column or post to the bottom of the reservoir 12. By having the beer enter the bottom of the reservoir 12 undesirable foaming is eliminated.

The reservoir 12 of filling machine 14, carries a ball type float 22 mounted on a pivoted operating arm of a valve 24 provided within the reservoir 12. A change in the beer level within the reservoir 12 will cause the float to either open or close the valve 24.

Valve 24 is connected to a conduit 26 which extends out through the side wall of the reservoir and terminates in a collar fixed to the rotating reservoir 12. Disposed centrally of collar 28 is a stationary fitting 30 which rotates with respect to the collar 28 and connects conduit 26 to a pump control line 32. Pump control line 32 extends to a pressure switch 36 mounted in a control box 34. The pressure switch 36 controls a circuit to the electric motor 18 which drives pump 16. A bleed fitting 38 is provided in the fluid connection or pump control line 32 in order that pressure in the line 32 may bleed to atmosphere as hereinafter described. A counter-pressure line 40 extends from a source of carbon dioxide gas and through control box 34 to the fitting 30 so that gas thereby may be delivered to the top of reservoir 12. A pressure regulator 41 may be provided in line 40 to thereby control the pressure of gas delivered above the liquid. If desired, a vent control line 42 such as described in the application of Carl L. Day and Rudolph H. Breeback for Filling Machine, Serial No. 248,722 filed September 28, 1951, now Patent No. 2,692,075, may be connected to the fitting 30. As disclosed in said application, when the machine is stopped the vent control system will be effective to prevent liquid from flowing into the bottles from the reservoir. In more detail, the gas venting passage of each filling head can be closed so that pressure will build up in the containers and liquid will not be able to flow by gravity from the reservoir 12.

A starter switch 44 is provided in the control box 34, switch 44 being in a circuit with a relay 46 which controls a magnetic starter switch 48 in the circuit of the 3-phase electric motor 18. A common source of electric power not shown, may be used for the circuit containing the relay 46 as well as the circuit containing the magnetic switch 48.

The pump 16 is provided with means to protect it when the pipe or conduit 20 becomes clogged and excessive pressure is developed therein. A by-pass 50 is connected between the outlet and the inlet of the pump 16. A relief valve 52 located in the by-pass 50 will relieve the pressure developed in the line 20 when it exceeds a predetermined amount. When this condition arises the liquid will flow through the by-pass and back to the inlet side of the pump 16. A one-way check valve 54 is mounted in the outlet of the pump 16 so that there will be no possible chance of liquid backtracking through the pump due to excessive pressure in the line 20. By providing the filling system with a by-pass means to protect the pump, the maintenance and the repair to the system is decreased if line 20 becomes closed or clogged.

The operation of the system is as follows: Beer will be supplied to the reservoir 12 to a predetermined height through line 20 and counterpressure line 40 will maintain gas in the upper portion of the reservoir at a pressure controlled by regulator 41, for example, at approximately eight pounds per square inch pressure. A relief valve 55 will relieve the pressure in the reservoir 12 when it exceeds eight pounds per square inch. As the beer is delivered to the containers on the container supporting platform of the filling machine, the level of the beer int he reservoir 12 will lower causing the float ball 22 to close the valve 24. When valve 24 closes, the gas in line 32 and acting upon the pressure controlled switch 36 will be isolated from reservoir 12. However, this pressure will bleed out of the valve 38 at a suitable and predetermined rate. When the pressure in line 32 and switch 36 drops to suitable extent, for example, 2 pounds per square inch, switch 36 will close and energize the circuit to the relay 46. The relay 46 will in turn close the magnetic starter switch 48 to start the electric motor 18.

Pump 16 will then pump liquid into the reservoir 12 causing the float 22 to rise. When the beer in the reservoir 12 has reached a predetermined height the float 22 will open valve 24 allowing the gas under pressure in the top of the reservoir 12 to enter the line 32 and flow to the pressure actuated switch 36. When the pressure at switch 36 reaches a predetermined point, for example, 4 pounds, switch 36 will open, thereby breaking the circuit to the relay 46 to cause the switch 48 in the motor circuit to open and thus stop motor 18 and pump 16. It will be observed that the bleed 38 is always open so that excess pressure in line 32 may bleed off when valve 24 is open.

The system disclosed in the present application may be provided with the arrangement disclosed in my application for Filling System filed December 31, 1951, Serial No 261,554, now Patent No. 2,737,194, and including an air operated shut-off valve located intermediate of the storage tank 10 and the pump 16 in order that the beer may be positively cut off from the pump 16 when said pump is inoperative. By providing the system with an air operated shut-off valve, the storage tank 10 could be located above the filling machine and the static head caused by such a location would not effect the operation of the system as beer could not seep by the inoperative pump causing a flooding of the reservoir 12.

The terminology used in the specification is for the purpose of description and not of limitation, the scope of the invention being defined in the claims.

I claim:

1. In a filling system for a carbonated liquid, a filling machine including a reservoir for a body of the liquid and a superposed body of gas, a source of liquid, means operatively connecting said reservoir to said source of liquid for delivering liquid from said source to said reservoir, said last mentioned means including an electric motor operated pump, means operatively connected to said reservoir for supplying gas under pressure to the area in said reservoir above the liquid, and means dependent upon the level of liquid in said reservoir for controlling the operation of said motor operated pump, said latter means for controlling operation of said motor operated pump comprising a float in said reservoir moveable by the level of liquid therein, a gas valve operatively connected to said float and actuated thereby, said gas valve being opened to the gas-containing area of said reservoir by a rise of liquid therein, a pressure operated switch utilizing pressure of gas in the reservoir and controlling the starting and stopping of said motor operated pump, a fluid flow line between said switch and said float operated gas valve, said switch being operable to circuit closing position by a decrease in gas pressure and operable to circuit opening position by an increase in gas pressure, and means operatively connected to said fluid flow line for bleeding pressure therefrom to atmosphere whereby closing of said float operated valve will cause said switch to close and operate said pump.

2. In a filling system for a carbonated liquid, a filling machine including a reservoir for a body of the liquid and a superposed body of gas at a constant pressure, a source of liquid, liquid delivery means operatively connecting said source to said reservoir for delivering liquid to said reservoir, means operatively connected to said reservoir for supplying gas under pressure to the gas-containing portion thereof, a pressure operated switch operatively connected to said liquid delivery means for controlling the starting and stopping of said delivery means, said switch when closed causing said liquid delivery means to deliver liquid to said reservoir and when opened by a predetermined pressure of gas above the liquid in said reservoir causing said liquid delivery means to stop delivering liquid, means operatively connected to said switch for bleeding pressure therefrom, and valve means operatively connected to said switch and actuated by the level of liquid in said reservoir, said valve means being opened to the interior of the reservoir for admitting pressure of gas above the liquid in said reservoir to said switch to open said switch.

References Cited in the file of this patent

UNITED STATES PATENTS

| 2,660,360 | Gricar Jr. et al. | Sept. 17, 1949 |
| 2,737,194 | Breeback | Mar. 6, 1956 |